Patented Nov. 28, 1944

2,363,597

UNITED STATES PATENT OFFICE 2,363,597

PACKING COMPOSITIONS

Charles Leon Jones, Wilmington, Del., assignor to Hercules Powder Company, Wilmington, Del., a corporation of Delaware No Drawing. Application June 12, 1942,
Serial No. 446,839

3 Claims. (Cl. 252—29)

This invention relates to packing materials and more particularly it relates to packing materials containing an inert lubricant.

In apparatus containing nitric acid it has been impossible to find a satisfactory material for packing pumps, valves, cocks, and other fittings and equipment which come in contact with the nitric acid. The packing around movable parts must contain some type of lubricant. Difficulty has been encounterd in obtaining a lubricant which sufficiently penetrates and adheres to the packing and which does not react with the nitric acid. Reaction with the nitric acid is objectionable as the nitration of the lubricant impairs its lubricating efficiency and necessitates frequent repacking. In addition the presence of the nitrates so formed is dangerous. The propensity of the nitrates to explode has caused severe accidents with resulting loss of human life and injury to equipment.

Now in accordance with this invention a packing has been found which is free of grease, hydrocarbons, or other nitratable material. It contains a well-dispersed and adherent lubricant which will not react with the nitric acid and is therefore much longer lasting and of no danger.

The packing and lubricating material is prepared in accordance with this invention by impregnating asbestos with fine particles of graphite. Usually the graphite is in colloidal form although particle size up to 325 mesh may be used. By using finely divided graphite it is possible to obtain high retention and great penetration of the asbestos.

Having indicated in a general way the nature of this invention, the following examples are given to more clearly illustrate the preparation of packings in accordance with this invention.

Example I

One hundred and three kilograms of braided blue African asbestos were placed in 10 liters of a colloidal suspension of graphite in water. The graphite particles present in the colloidal suspension were less than one micron in size and the concentration of the graphite in the water was 7%. The asbestos so treated retained an amount of graphite equal to 16% of the dry weight of the asbestos.

Example II

Another excellent lubricating and packing material for apparatus containing nitrating fluids was prepared in a manner similar to the method described in Example I. In this case the colloidal graphite was suspended in carbon tetrachloride. The penetration of the graphite into the asbestos was facilitated by placing the asbestos in a vacuum before adding the colloidal suspension of graphite. In this way the air was removed from the pores of the asbestos, thereby making it easier for the liquid containing the graphite to penetrate throughout the asbestos. The packing material obtained through this procedure retained an amount of graphite equal to 20% of the weight of the asbestos.

In place of the braided blue African asbestos used in the examples any of the fibrous forms of actinolite which is free of nitratable material may be used. Thus excellent packings were made in accordance with this invention using North American asbestos.

In place of the water or carbon tetrachloride used in the examples, any inert or volatile liquid may be used as a vehicle for the graphite particles. For example, naphtha, choloroform, acetone, ethyl acetate, methylene chloride, and the like, may be used. Before the packing is used in an acid containing apparatus, the naphtha or other vehicle will be evaporated or steamed out of the impregnated packing.

Although the size of the graphite particles used in the impregnation process shown in the examples was one micron or less, desirable results are obtained using particles as large as about 325 mesh. Larger particle graphite is not readily distributed uniformly in the asbestos. The colloidal form recommends itself as the fineness of the particles precludes any tendency of the graphite to segregate or ball-up in the packing with consequent failure in service.

The graphite content in the asbestos may vary anywhere from about 3% to about 90% based on the weight of the asbestos and preferably from about 5% to about 50%. In order to accomplish the higher degrees of retention of graphite in the asbestos, the impregnating process may be carried out with use of heat and both positive and negative pressures. By this process the air is exhausted from the free spaces in the asbestos by placing the asbestos in a vacuum before immersing it in the colloidal graphite solution. The graphite solution is then forced under pressure into the air-free spaces in the asbestos.

A further method of preparing packing in accordance with this invention is to immerse the asbestos yarn in a bath of a liquid suspension of colloidal graphite or in finely divided powdered dry or amorphous graphite of a fineness of 325 mesh or smaller particle size.

A still further method of accomplishing the addition of the graphite to the asbestos is to masticate the asbestos and mix it in a masticated condition with the finely divided graphite with or without the inclusion of a non-nitrable binder. The plastic material produced by this process may be extruded or molded into forms of the desired shape.

Although the composition prepared in accordance with this invention is particularly adapted for packing in apparatus containing nitrating fluids, (e. g. nitrosyl chloride, nitrogen oxides, nitric acid, nitric acid mixed with sulphuric acid, nitric acid mixed with a fortifying acid such as oleum, etc.) because it removes the danger of explosions caused by nitration of materials in the lubricant, it is well suited as a packing in machinery handling any oxidizing fluid or acid, such as hydrogen peroxide, chromic acid, perchloric acid, dichromate solutions, chlorine, chlorine solutions, bromine, oleum, sulphuric acid and the like. Although in apparatus handling these materials, there is not the problem of eliminating explosions, there is the problem of obtaining a packing of long life. Packings containing the usual grease or oil lubricants are short lived as the acid or oxidizing fluid attacks the lubricant and impairs its efficiency. Acid pumps and other machinery packed with a packing prepared in accordance with this invention are less expensive to operate as the packing is longer lived and consequently the apparatus has to be taken down and repacked less often. The graphite is inert to oxidation and its efficiency as a lubricant is not impaired by the presence of an oxidant. Acid containing equipment packed with material in accordance with this invention can be run for extended periods without interruptions necessitated by tearing down the equipment and repacking the moving parts.

Packing made in accordance with this invention was employed in packing the glands of circulating pumps in apparatus containing strong nitric acid. The packing lasted for a period in excess of 10 weeks without a breakdown in the efficiency of the lubricant. Previous packings failed in from 2 to 4 weeks. The lubricating agent broke down thereby causing severe scoring of the metal shaft and in some instances the lubricant became sufficiently nitrated to cause severe explosions.

Extensive tests have been made upon packings produced in accordance with this invention. The results of these tests show that these packings substantially eliminate scoring of metal shafts and are completely shotproof. No nitration of the ingredients is possible and consequently there is no possibility of an explosion.

What I claim and desire to protect by Letters Patent is:

1. As a new article of manufacture, a compacted packing and lubricating mass composed of a uniform mixture essentially comprising asbestos fibers and particles of graphite of colloidal dimension, said mass characterized by being inert to oxidizing and nitrating action and the graphite being present in amount from about 5% to about 50% of the dry weight of the asbestos.

2. As a new article of manufacture, a compacted packing and lubricating mass composed of a mixture essentially comprising North American asbestos fibers substantially uniformly impregnated with particles of graphite of colloidal dimension, said mass characterized by being inert to oxidizing and nitrating action and the graphite being present in amount from about 5% to about 50% of the dry weight of the asbestos.

3. As a new article of manufacture, a compacted packing and lubricating mass composed of a mixture essentially comprising blue African asbestos fibers substantially uniformly impregnated with particles of graphite of colloidal dimension, said mass characterized by being inert to oxidizing and nitrating action and the graphite being present in amount from about 5% to about 50% of the dry weight of the asbestos.

C. L. JONES.